US011128781B2

(12) United States Patent
Kato et al.

(10) Patent No.: US 11,128,781 B2
(45) Date of Patent: Sep. 21, 2021

(54) IMAGE PROCESSING APPARATUS

(71) Applicant: KYOCERA Document Solutions Inc., Osaka (JP)

(72) Inventors: Ryosuke Kato, Osaka (JP); Toshiaki Mutsuo, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/075,813

(22) Filed: Oct. 21, 2020

(65) Prior Publication Data

US 2021/0127038 A1 Apr. 29, 2021

(30) Foreign Application Priority Data

Oct. 29, 2019 (JP) ............................ JP2019-196509
Oct. 29, 2019 (JP) ............................ JP2019-196510
Oct. 29, 2019 (JP) ............................ JP2019-196511

(51) Int. Cl.

| | |
|---|---|
| ***H04N 1/58*** | (2006.01) |
| ***H04N 1/32*** | (2006.01) |
| ***H04N 1/00*** | (2006.01) |
| ***H04N 1/407*** | (2006.01) |

(52) U.S. Cl.

CPC .......... *H04N 1/58* (2013.01); *H04N 1/00331* (2013.01); *H04N 1/32256* (2013.01); *H04N 1/32261* (2013.01); *H04N 1/4074* (2013.01)

(58) Field of Classification Search

CPC combination set(s) only.
See application file for complete search history.

(56) References Cited

U.S. PATENT DOCUMENTS 6,628,831 B1 * 9/2003 Needham .......... H04N 1/00244
382/168

FOREIGN PATENT DOCUMENTS

| | | |
|---|---|---|
| JP | H07-262348 | 10/1995 |
| JP | 2001-245148 | 9/2001 |

* cited by examiner

*Primary Examiner* — Christopher Wait
(74) *Attorney, Agent, or Firm* — Lex IP Meister, PLLC

(57) ABSTRACT

An image processing apparatus includes a filtering processing unit that executes a filtering process to suppress background noise of input image data; a threshold setting unit that sets a binarization threshold for the input image data; a background noise determination threshold setting unit that determines that a tone value at which the number of pixels of background noise of the input image data reaches a peak is a background peak tone value and that sets, as a background noise determination threshold, a tone value having a density higher than a density of the background peak tone value and having a number of pixels within a specific range of percentages, of the number of pixels at the peak; a background noise reduction processing unit that executes a background noise reduction process on the input image data and a binarization processing unit that executes a binarization process on the input image data.

10 Claims, 18 Drawing Sheets

FIG. 8A

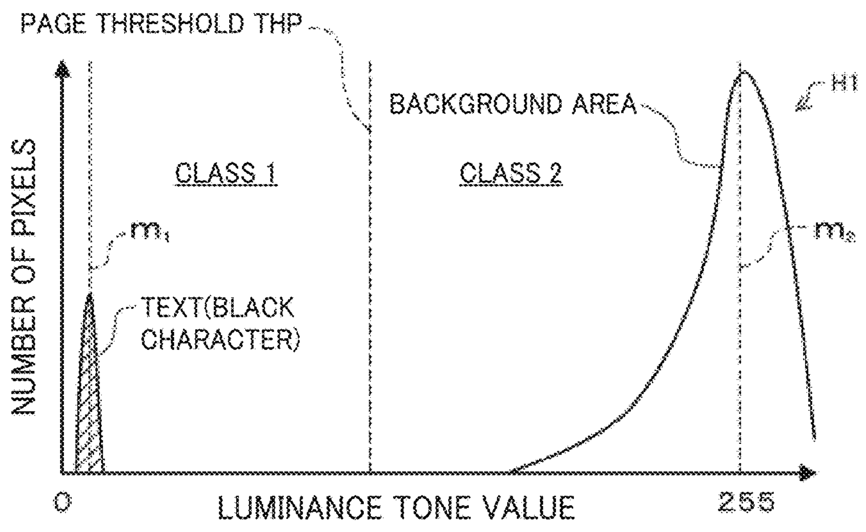

FIG. 8B $$\sigma_W^2 = \frac{\omega_1\sigma_1^2 + \omega_2\sigma_2^2}{\omega_1 + \omega_2} \quad \cdots F1$$

$$\sigma_B^2 = \frac{2\omega_1\omega_2(m_1 - m_2)^2}{(\omega_1 + \omega_2)^2} \quad \cdots F2$$

$$\text{TOTAL VARIANCE (EVALUATION VALUE)} = \frac{\sigma_B^2}{\sigma_W^2} \quad \cdots F3$$

$\omega_1$ : NUMBER OF PIXELS OF CLASS 1
$m_1$ : AVERAGE LUMINANCE VALUE OF CLASS 1
$\sigma_1^2$ : VARIANCE VALUE OF CLASS 1

$\omega_2$ : NUMBER OF PIXELS OF CLASS 2
$m_2$ : AVERAGE LUMINANCE VALUE OF CLASS 2
$\sigma_2^2$ : VARIANCE VALUE OF CLASS 2

ORDER FORM NOVEMBER 1, 2019

| ORDER NUMBER ☐ | |
|---|---|
| PRODUCT NAME | COMPLETE UNDERSTANDING OF ☐ SCANNER |
| QUANTITY | ONE |
| PRICE | JPY 1000 |
| DELIVERY TIME | NOVEMBER 22, 2019 |
| REMARKS | |

FIG. 14A

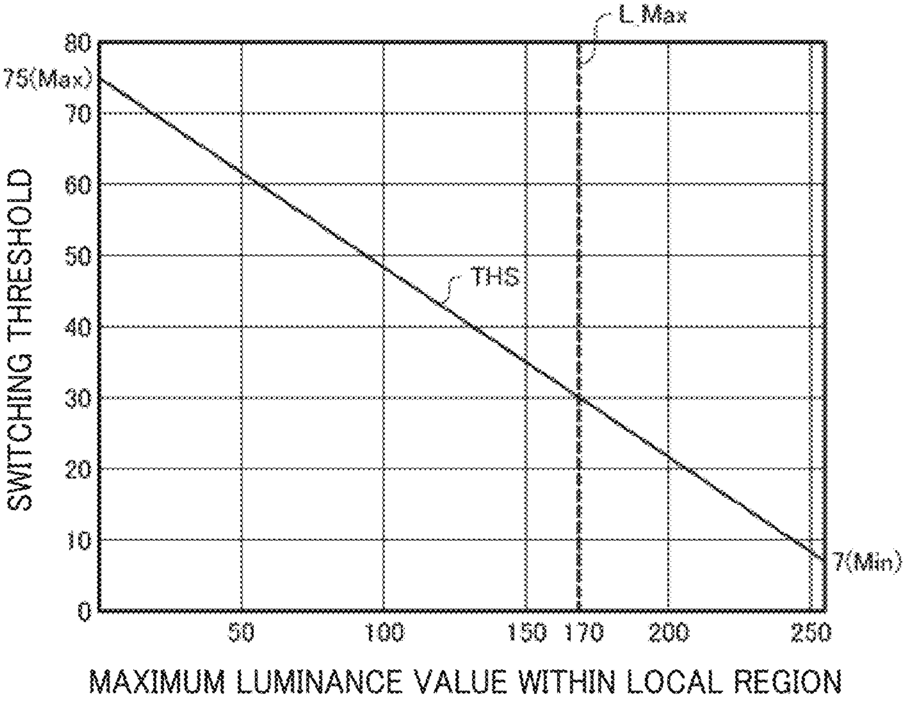

FIG. 14B

THS=S_Max−(S_Max−S_Min)×L_Max/255 · · · F4

THS : SWITCHING THRESHOLD
S_Max : MAXIMUM SETTING VALUE (75 IN THIS EXAMPLE)
S_Min : MINIMUM SETTING VALUE (7 IN THIS EXAMPLE
L_Max : MAXIMUM LUMINANCE VALUE IN LOCAL REGION

LC=L_Max−L_Min · · · F5

L_Max : MAXIMUM LUMINANCE VALUE IN LOCAL REGION
L_Min : MINIMUM LUMINANCE VALUE IN LOCAL REGION

THL=L_Min+LC×α · · · F6

THL : LOCAL THRESHOLD
α : COEFFICIENT (0.1 OR MORE)

FIG. 15A

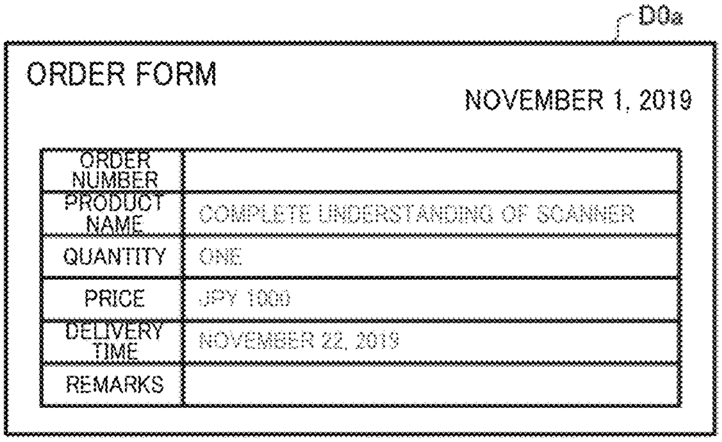
D0a

ORDER FORM

NOVEMBER 1, 2019

| | |
|---|---|
| ORDER NUMBER | |
| PRODUCT NAME | COMPLETE UNDERSTANDING OF SCANNER |
| QUANTITY | ONE |
| PRICE | JPY 1000 |
| DELIVERY TIME | NOVEMBER 22, 2019 |
| REMARKS | |

FIG. 15B

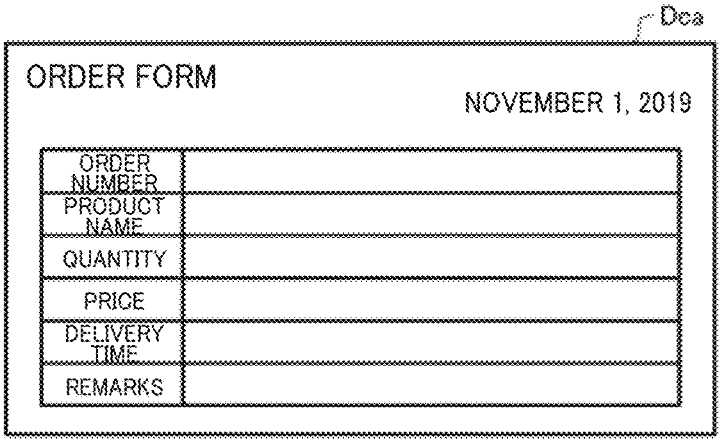
Dca

ORDER FORM

NOVEMBER 1, 2019

| | |
|---|---|
| ORDER NUMBER | |
| PRODUCT NAME | |
| QUANTITY | |
| PRICE | |
| DELIVERY TIME | |
| REMARKS | |

FIG. 15C

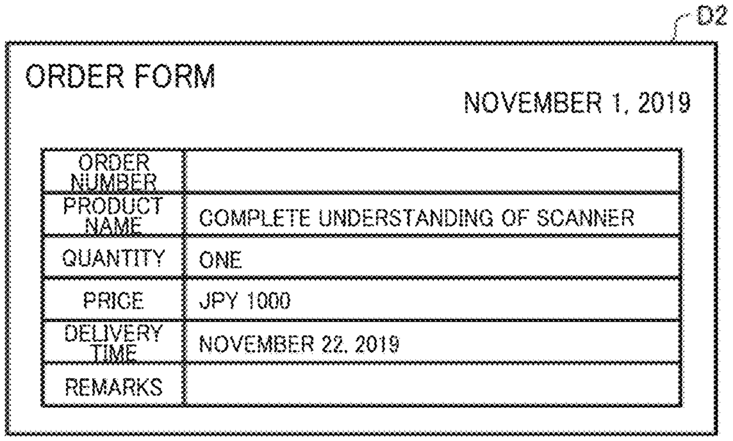
D2

ORDER FORM

NOVEMBER 1, 2019

| | |
|---|---|
| ORDER NUMBER | |
| PRODUCT NAME | COMPLETE UNDERSTANDING OF SCANNER |
| QUANTITY | ONE |
| PRICE | JPY 1000 |
| DELIVERY TIME | NOVEMBER 22, 2019 |
| REMARKS | |

IMAGE PROCESSING APPARATUS

INCORPORATION BY REFERENCE

This application is based upon, and claims the benefit of priority from, corresponding Japanese Patent Application No. 2019-196509, Japanese Patent Application No. 2019-196510 and Japanese Patent Application No. 2019-196511 filed in the Japan Patent Office on Oct. 29, 2019, the entire contents of which are incorporated herein by reference.

BACKGROUND

Field of the Invention

The present disclosure relates to an image processing apparatus, an image processing method, and an image processing program and, particularly, to a binarization processing technology.

Description of Related Art

There is a problem in that, when a document containing a background-area noise is read and the read image is subjected to a binarization process, an unnecessary background-area noise remains. To solve this problem, there are disclosed technologies in which, in the density histogram of an input image, the moving average of the frequency is obtained with regard to each density, a binarization slice level is obtained based on the density value with regard to the highest frequency as a result, and then binarization is executed, or in which the "cell" of n×n pixels is acquired, the measurement region of m×m pixels ($n<m$) is set around the cell, a local threshold is obtained for the cell based on the luminance histogram within the measurement region, and the cell is binarized by using the local threshold within the preset range of limit values. The preset range of limit values is to suppress the extraction of noise components.

SUMMARY

An image processing apparatus according to the present disclosure includes: a filtering processing unit that executes a filtering process to suppress a background noise of input image data; a threshold setting unit that sets a binarization threshold for the input image data having undergone the filtering process; a background noise determination threshold setting unit that determines that a tone value at which a number of pixels of a background noise of the input image data having undergone the filtering process reaches a peak is a background peak tone value and that sets, as a background noise determination threshold, a tone value having a density higher than a density of the background peak tone value and having a number of pixels within a specific range of percentages of the number of pixels at the peak; a background noise reduction processing unit that executes a background noise reduction process on the input image data having undergone the filtering process in accordance with the binarization threshold and the background noise determination threshold; and a binarization processing unit that executes a binarization process on the input image data having undergone the background noise reduction process in accordance with the binarization threshold.

BRIEF DESCRIPTION OF THE DRAWINGS

FIGS. 8A and 8B are explanatory diagrams illustrating the details of the page threshold setting process according to the first embodiment;

FIGS. 14A and 14B are drawings illustrating a switching threshold THS according to the first embodiment;

FIGS. 15A, 15B and 15C are explanatory diagrams illustrating the details of a binarization process according to the first embodiment;

DETAILED DESCRIPTION

Aspects (hereafter referred to as "embodiments") for carrying out the present disclosure are described below with reference to the drawings in the following order.

A. First embodiment:
B. Second embodiment:
C. Modification:

A. First Embodiment

Figure 1:
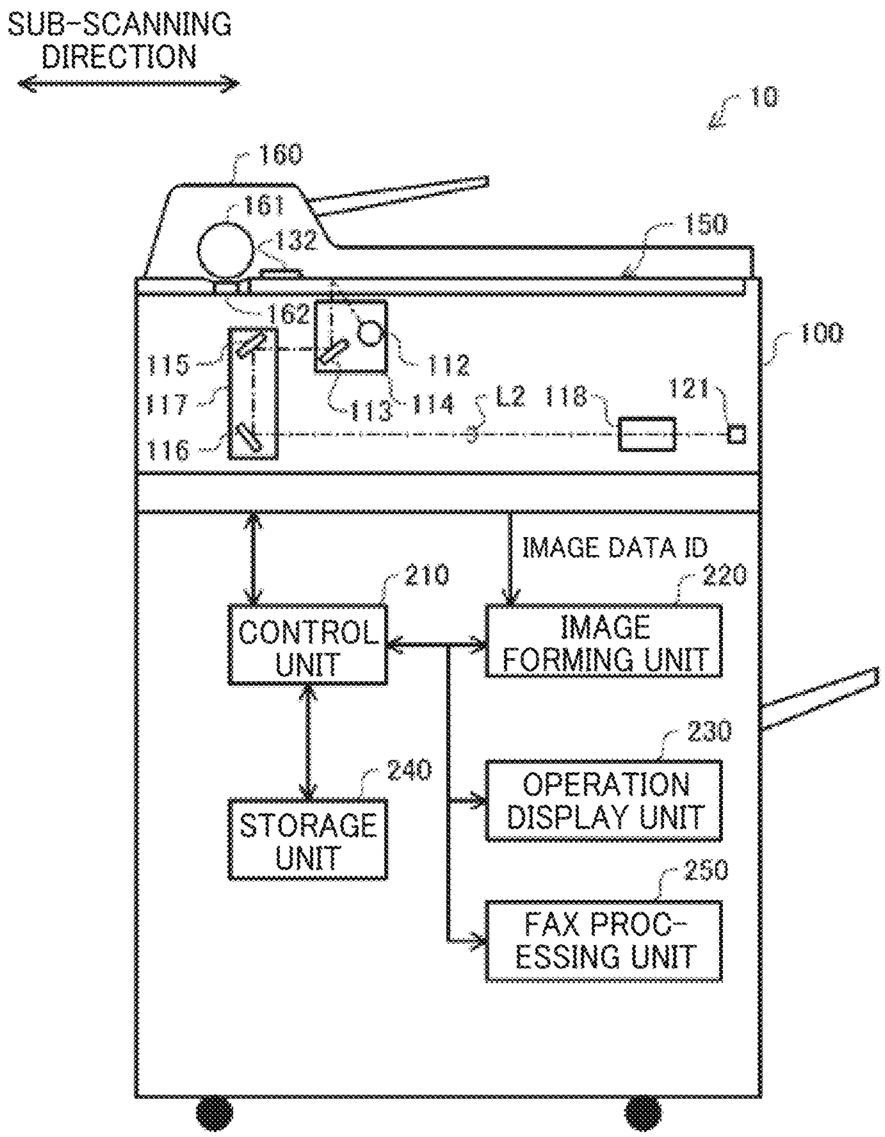
FIG. 1 is a schematic configuration diagram illustrating an overall configuration of an image forming apparatus 10 according to a first embodiment of the present disclosure.
Figure 2:
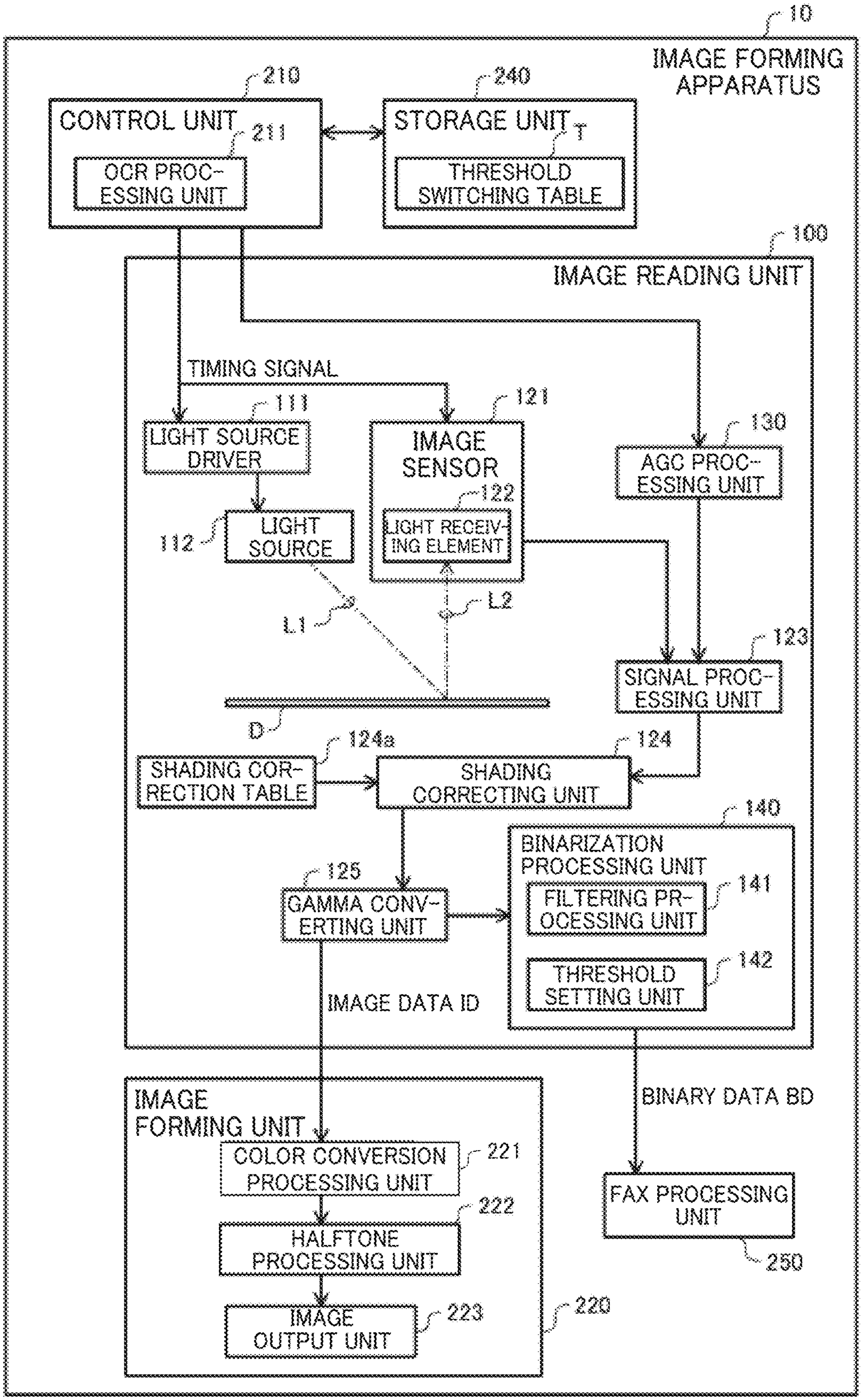
FIG. 2 is a block diagram illustrating a functional configuration of the image forming apparatus 10 according to the first embodiment.

FIG. 1 is a schematic configuration diagram illustrating an overall configuration of an image forming apparatus 10 according to a first embodiment of the present disclosure. FIG. 2 is a block diagram illustrating a functional configuration of the image forming apparatus 10 according to the first embodiment. The image forming apparatus 10 includes an image reading unit 100, a control unit 210, an image forming unit 220, an operation display unit 230, a storage unit 240, and a FAX processing unit 250. The image reading unit 100 includes an automatic document feeder (ADF) 160 and a platen (contact glass) 150 to read the image (original image) from a document and generate image data ID that is digital data.

The image forming unit 220 forms an image on a print medium (not illustrated) based on the image data ID and discharges the print medium. The image forming unit 220 includes a color conversion processing unit 221, a halftone processing unit 222, and an image output unit 223. The color conversion processing unit 221 executes color conversion to convert the image data ID, which is RGB data, into CMYK image data. The halftone processing unit 222 executes halftone processing to generate the halftone data on CMYK image data. The image output unit 223 forms an image based on halftone data. The operation display unit 230 receives user's operation input from a display (not illustrated), which functions as a touch panel, various buttons (not illustrated), or switches (not illustrated).

The control unit 210 includes a main storage means, such as a RAM and a ROM, and a control means such as an MPU (Micro Processing Unit) or a CPU (Central Processing Unit). The control unit 210 has a controller function regarding an interface, such as various I/Os, a USB (universal serial bus), a bus, or other pieces of hardware to control the overall image forming apparatus 10.

The storage unit 240 is a storage device such as a hard disk drive or a flash memory, which is a non-transitory recording medium, to store a control program (including an image processing program) or data for a process executed by the control unit 210 or a binarization processing unit 140.

As illustrated in FIG. 2, the image reading unit 100 includes a light source driver 111 and a light source 112. The light source 112 includes a plurality of LEDs (not illustrated) that irradiate a document D with light. The light source driver 111 is an LED driver that drives a plurality of LEDs arranged in the main scanning direction so as to control the on-off drive of the light source 112. Accordingly, the light source 112 may irradiate the document surface of the document D with irradiation light L1 through pulse width modulation (PWM) using variable frequency drive.

The irradiation light L1 is emitted at an angle of 45 degrees (an inclined direction) with respect to the direction perpendicular to the surface of the document D. The document D reflects light as reflected light including diffusely reflected light L2 and regularly reflected light. A light receiving element 122 receives the diffusely reflected light L2.

As illustrated in FIG. 1, the image reading unit 100 further includes a first reflective mirror 113, a first carriage 114, a second reflective mirror 115, a third reflective mirror 116, a second carriage 117, and a condensing lens 118, provided between the document D and the image sensor 121. The first reflective mirror 113 reflects the diffusely reflected light L2 from the document D toward the second reflective mirror 115. The second reflective mirror 115 reflects the diffusely reflected light L2 toward the third reflective mirror 116. The third reflective mirror 116 reflects the diffusely reflected light L2 toward the condensing lens 118. The condensing lens 118 focuses the diffusely reflected light L2 onto each light receiving surface (not illustrated) of the light receiving elements 122 included in the image sensor 121.

The image sensor 121 is three CCD line sensors (not illustrated) that detect three colors R, G, and B using color filters (not illustrated) of the respective color components R, G, and B. The image sensor 121 scans (vertical scan) a document with the three CCD line sensors extending in the main scanning direction to acquire the image on the document as the combination of voltage values corresponding to R, G, and B. In this manner, the image sensor 121 may perform photoelectric conversion processing to output R, G, and B analog electrical signals of each pixel in the main scanning direction.

The first carriage 114 includes the light source 112 and the first reflective mirror 113 and moves back and forth in the sub-scanning direction. The second carriage 117 includes the second reflective mirror 115 and the third reflective mirror 116 and moves back and forth in the sub-scanning direction. The first carriage 114 and the second carriage 117 are controlled by the control unit 210 that functions as a scanning control unit. This allows the light source 112 to scan the document in the sub-scanning direction, and therefore the image sensor 121 may output the analog electrical signal corresponding to the two-dimensional image on the document.

When the automatic document feeder (ADF) 160 is used, the first carriage 114 and the second carriage 117 are fixed at a preset sub-scanning position, and the scan in the sub-scanning direction is executed due to the automatic feeding of the document D. The ADF 160 may execute simultaneous or sequential reading of two sides as well as one side.

The ADF 160 includes a sheet feed roller 161 and a document reading slit 162. The sheet feed roller 161 automatically feeds a document so that the document is read through the document reading slit 162. In this case, as the first carriage 114 is fixed at a preset sub-scanning position, the light source 112 included in the first carriage 114 is also fixed at a specific position.

As illustrated in FIG. 2, the image reading unit 100 further includes a signal processing unit 123, a shading correcting unit 124, a shading correction table 124*a*, a gamma converting unit 125, the binarization processing unit 140, an AGC processing unit 130, and a white reference plate 132 (see FIG. 1). The binarization processing unit 140 has a filtering processing unit 141 and a threshold setting unit 142.

The signal processing unit 123 is a variable-gain amplifier having an A/D conversion function. The signal processing unit 123 amplifies an analog electric signal with the gain set by the AGC processing unit 130 and stored in the storage unit 240 and executes A/D conversion on the amplified analog electrical signal to obtain digital data.

According to the present embodiment, the AGC processing unit 130 is a gain adjusting unit that sets the optimum gain and the offset value for each of the light receiving elements 122 by using a black reference signal and a white reference signal. The black reference signal is an analog electrical signal of the light receiving element 122 when the light source 112 is off. The white reference signal is an analog electrical signal of the light receiving element 122 when the white reference plate 132 is irradiated instead of the document D.

The AGC processing unit 130 sets an offset value such that each tone value of RGB of the image data ID has the minimum value "0" when the signal processing unit 123 executes A/D conversion on the black reference signal. The AGC processing unit 130 sets the gain such that each tone value of RGB of the image data ID has the maximum value "255" when the signal processing unit 123 executes A/D conversion on the white reference signal by using the offset value. This makes it possible to effectively use the dynamic range from the minimum value "0" to the maximum value "255".

The shading correcting unit 124 executes shading correction on digital data to generate the image data ID. The shading correction is a correction for suppressing peripheral shading due to unevenness of the amount of light of the light source 112 in a length direction, the effects of the cosine fourth law on a lens, or shading caused due to unevenness of the sensitivity of the light receiving elements 122 arranged in the main scanning direction. The gamma converting unit 125 performs gamma conversion based on the characteristics of the image reading unit 100. This allows the image reading unit 100 to generate the image data ID having each tone value of RGB.

The binarization processing unit 140 uses the calculation formula (a luminance value L≈0.3R+0.6G+0.1B) for the luminance value L and uses each tone value of RGB of the image data ID to calculate the luminance value L and generate monochrome image data MD0. The binarization processing unit 140 further executes a binarization process on the monochrome image data MD0 to obtain binary data BD in which each pixel is represented by one bit. The FAX processing unit 250 may execute facsimile transmission processing by using the binary data BD having a small data size.

As described above, the image reading unit 100 reads the image on the document D, generates the image data ID, and generates the binary data BD as appropriate. The image data ID is RGB image data in which the image on the document D is represented by using each tone value (0 to 255) of RGB.

Figure 3A:
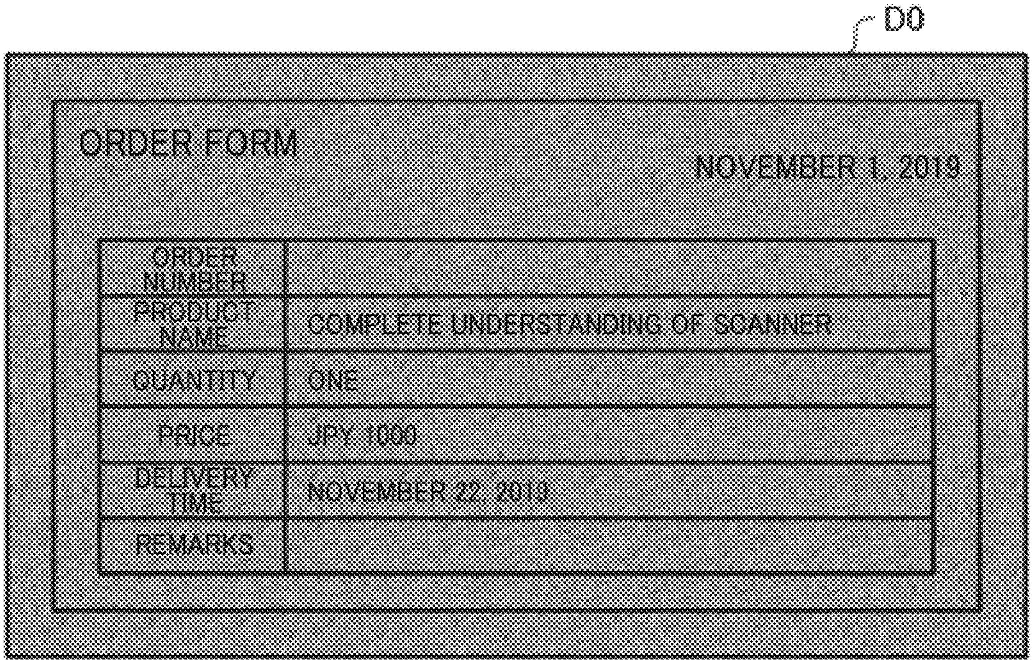
FIGS. 3A and 3B are explanatory diagrams illustrating a read image and a luminance histogram of the read image.
Figure 3B:
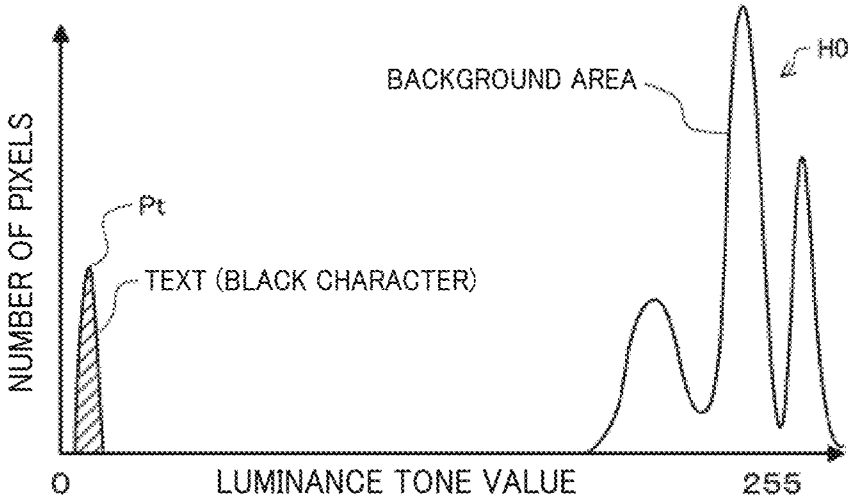

FIGS. 3A and 3B are explanatory diagrams illustrating a read image and a luminance histogram of the read image. FIG. 3A illustrates a document image D0. The document image D0 is a low-visibility image having a relatively low luminance of a background area. The document image D0 is the image represented by the image data ID generated after reading by the image reading unit 100.

FIG. 3B illustrates a luminance histogram H0 of the monochrome image data MD0. The monochrome image data MD0 is the histogram of the luminance value L of the image data ID representing the document image D0. The horizontal axis of the luminance histogram is a luminance tone value (0 (black) to 255 (white)), and the vertical axis is the number of pixels (frequency). The luminance histogram H0 includes a line-drawing pixel group that is a group of pixels forming a line-drawing image, such as a black character text or a ruled line, and a background-area pixel group that is a group of pixels forming a background-area image.

Figure 4A:
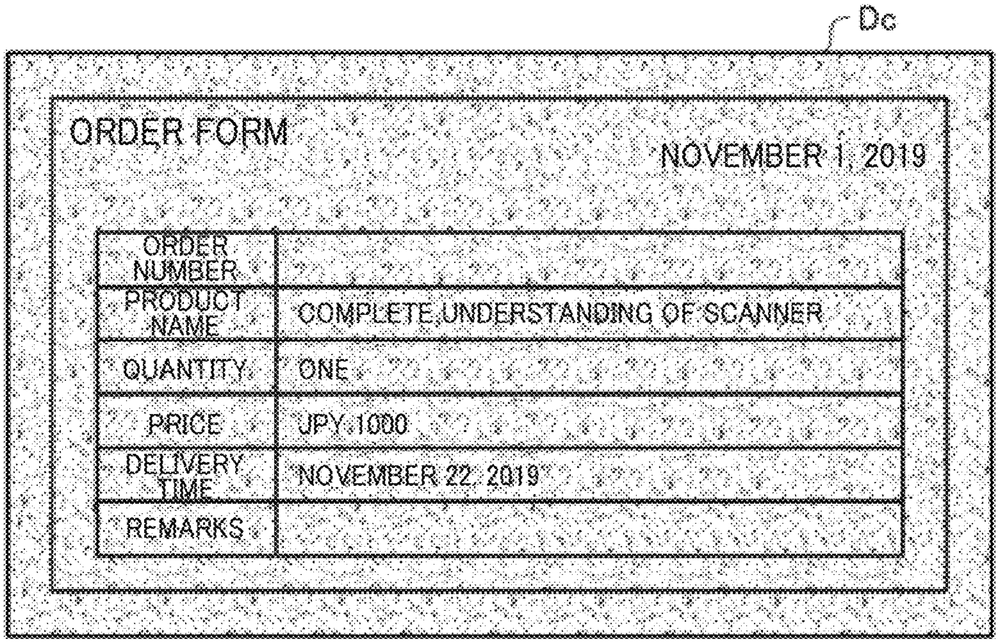
FIGS. 4A and 4B are explanatory diagrams illustrating a binarization process according to a comparative example and a binarization process threshold THc according to the comparative example.
Figure 4B:
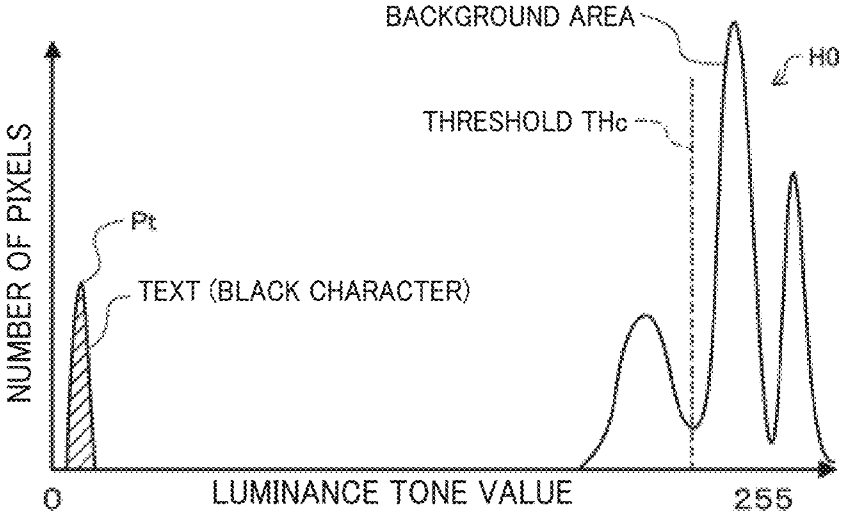

FIGS. 4A and 4B are explanatory diagrams illustrating a binarization process according to a comparative example and a binarization process threshold THc according to the comparative example. The binarization process threshold THc is set by using a discriminant analysis method (Otsu's method) according to a comparative example. The discriminant analysis method is a method in which a luminance histogram is divided into two classes by using a provisional threshold, the shape of the histogram is examined based on the variance value of each class and the variance value between the classes, and the threshold that seems to be at the trough at the lowest position is used. The processing details of the discriminant analysis method is described below.

FIG. 4A illustrates a binary image Dc that is the processing result of a binarization process according to the comparative example. The binary image Dc is the image represented by the binary data BD after the binarization process. The binary data BD is image data generated by the binarization processing unit 140 when the luminance tone value of the line-drawing pixel group in the monochrome image data MD0, which is input image data, is "0 (black)", the luminance tone value of a pixel included in the background-area pixel group and having the luminance tone value lower than the binarization process threshold THc is "0", and the luminance tone value of other pixels is "1 (white)".

FIG. 4B illustrates the binarization process threshold THc according to the comparative example. With the binarization process threshold THc, it is determined that the text image of the black character is a pattern region and also it is determined that the image region formed by the pixels having a low luminance in the background-area image is a pattern region. As the luminance of the background-area image, which is determined to be a pattern region, is changed to "0 (black)" by the binarization processing unit 140, the binary image Dc is a (rough) image with significantly deteriorated granularity due to the binarization process (see FIG. 4A).

Figure 5:
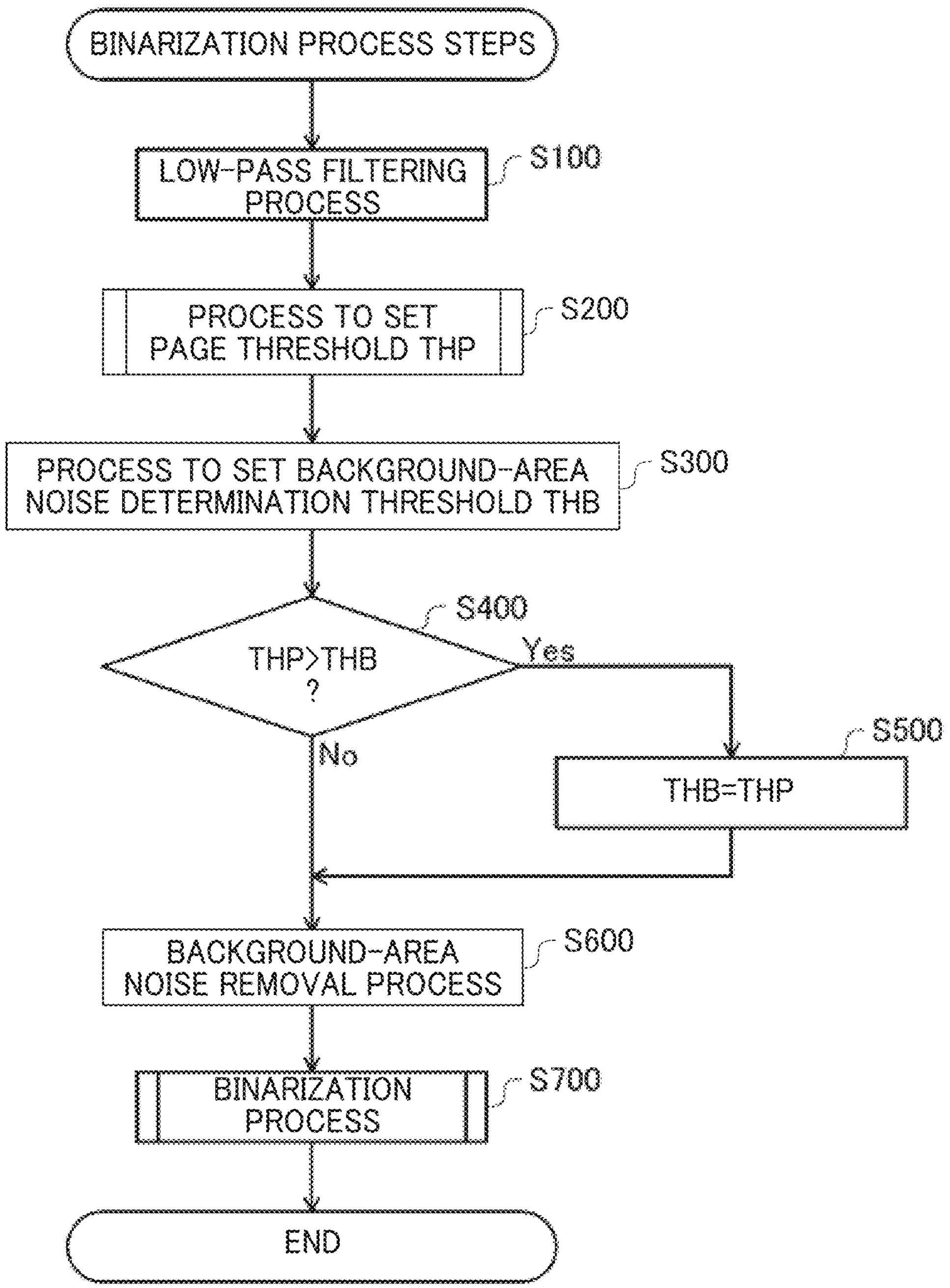
FIG. 5 is a flowchart illustrating the details of binarization process steps according to the first embodiment.

FIG. 5 is a flowchart illustrating the details of the binarization process steps according to the first embodiment. The binarization process according to the first embodiment may significantly prevent the deterioration of granularity caused due to the background-area image as described above.

At Step S100, the filtering processing unit 141 of the binarization processing unit 140 executes a low-pass filtering process. During the low-pass filtering process, the binarization processing unit 140 uses the Gaussian filter of 5×5 pixels for the monochrome image data MD0 (also referred to as "input image data") of for example 300 dpi to execute smoothing processing. Thus, the low-pass filtering process makes it possible to generate monochrome image data MD1 after smoothing the noise of the background-area image. The background-area image noise is an example of a background noise.

Figure 6A:
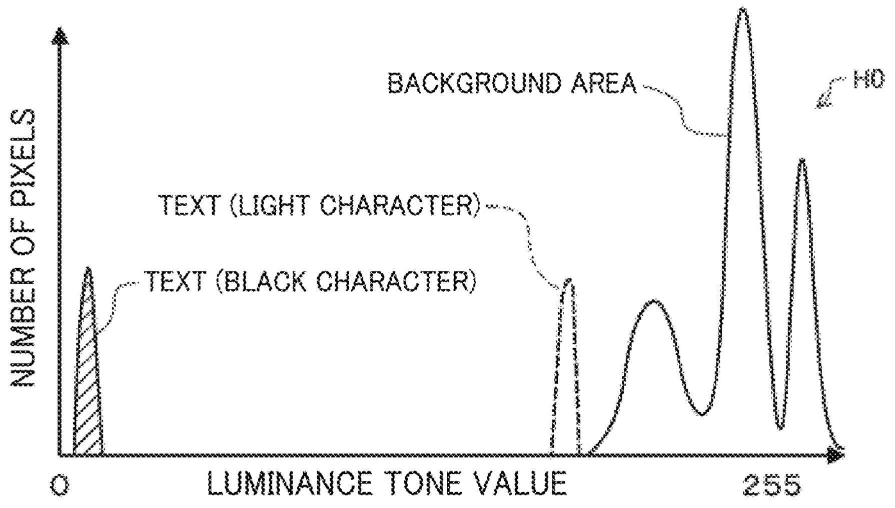
FIGS. 6A and 6B are explanatory diagrams illustrating the details of a low-pass filtering process according to the first embodiment.
Figure 6B:
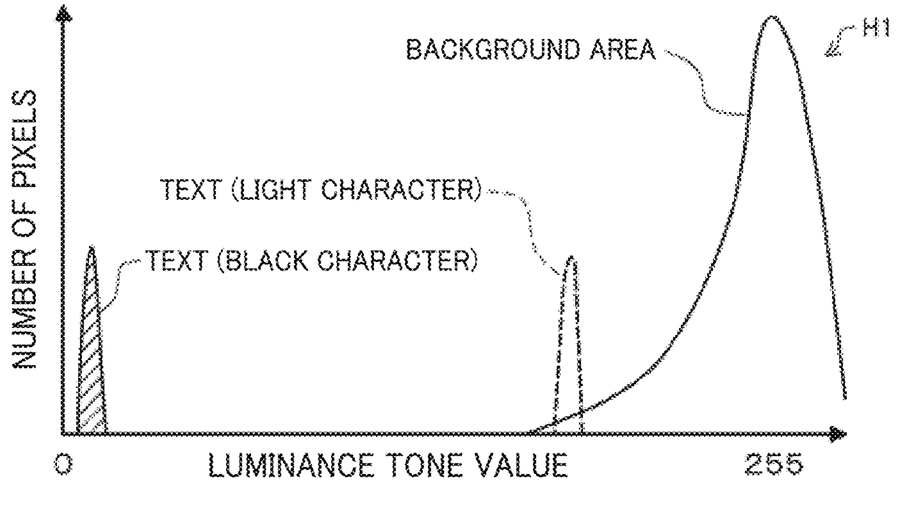

FIGS. 6A and 6B are explanatory diagrams illustrating the details of the low-pass filtering process according to the first embodiment. FIG. 6A illustrates the luminance histogram H0 of the monochrome image data MD0 before the low-pass filtering process. FIG. 6B illustrates a luminance histogram H1 of the monochrome image data MD1 after the low-pass filtering process. As it is understood from the luminance histogram H1, the discrete tone value distribution of the background-area pixel group has been formed to have the single peak.

The low-pass filtering process is executed to smooth a high-frequency component (the tone region (noisy and jagged luminance component) of the background area where fluctuations in a pixel value are sharp) of the monochrome image data MD0 so as to set the appropriate threshold for a background noise determination threshold setting process (Step S300).

At Step S200, the threshold setting unit 142 of the binarization processing unit 140 sets a page threshold THP based on the luminance histogram H1 after the low-pass filtering process. During the page threshold setting process, the binarization processing unit 140 uses the discriminant analysis method (Otsu's method) to set the page threshold. The page threshold THP is a binarization threshold that is applicable to the entire area of an image.

Figure 7:
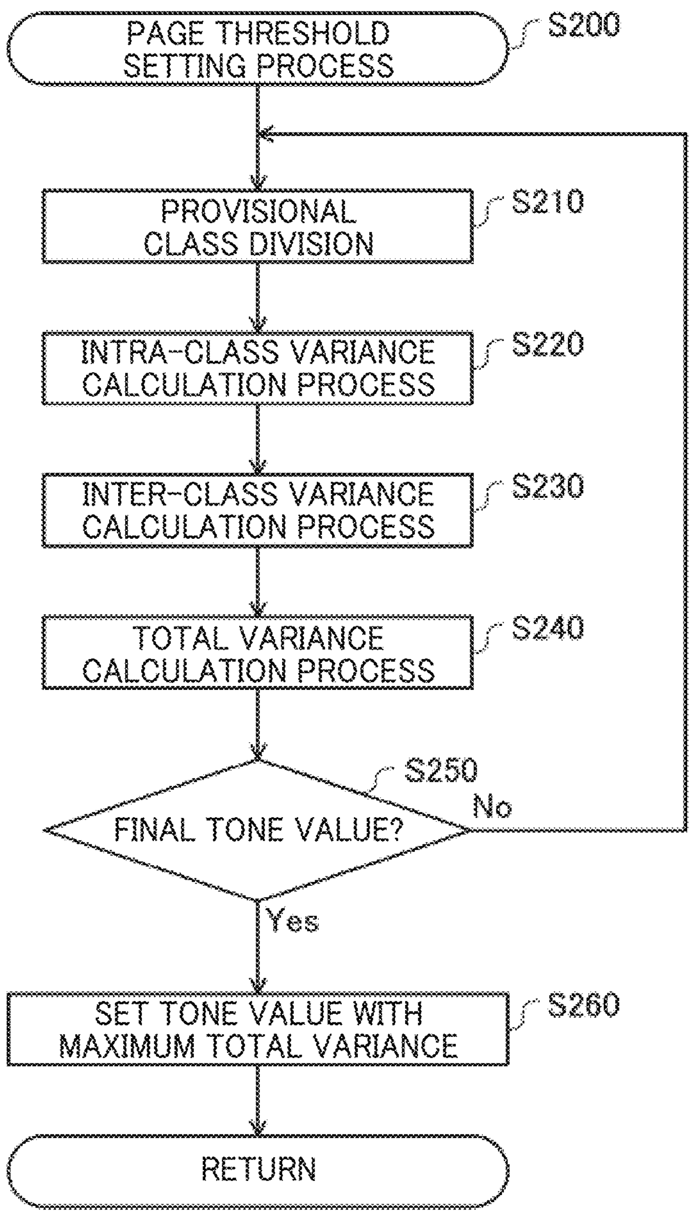
FIG. 7 is a flowchart illustrating the details of a page threshold setting process according to the first embodiment.

FIG. 7 is a flowchart illustrating the details of the page threshold setting process (Step S200) according to the first embodiment. FIG. 8 is an explanatory diagram illustrating the details of the page threshold setting process according to the first embodiment. At Step S210, the binarization processing unit 140 functions as a histogram analyzing unit and uses a provisional threshold to provisionally divide the luminance histogram H1 into two classes, i.e., class 1 (also referred to as "first class") and class 2 (also referred to as "second class") (see FIG. 8A). The second class is a class including a relatively high proportion of the background image.

At Step S220, the binarization processing unit 140 executes an intra-class variance calculation process. During the intra-class variance calculation process, the binarization processing unit 140 uses Formula F1 (see FIG. 8B) to calculate an intra-class variance. At Step S230, the binarization processing unit 140 executes an inter-class variance calculation process. During the inter-class variance calculation process, the binarization processing unit 140 uses Formula F2 (see FIG. 8B) to calculate an inter-class variance. At Step S240, the binarization processing unit 140 executes a total variance calculation process. During the total variance calculation process, the binarization processing unit 140 uses Formula F3 (see FIG. 8B) to calculate a total variance. The total variance may be used as an evaluation value for the provisional threshold.

The binarization processing unit 140 repeatedly executes the process from Step S210 to Step S240 on all the luminance tone values (Step S250). At Step S260, the binarization processing unit 140 sets the tone value with the maximum total variance as the page threshold THP.

At Step S300, the binarization processing unit 140 functions as a background noise determination threshold setting unit to set a background-area noise determination threshold THB that is a threshold for determining a background-area noise. This process (Step S300) may be skipped when the background area is in black. The background-area noise determination threshold THB is also referred to as a background noise determination threshold.

Figure 9A:
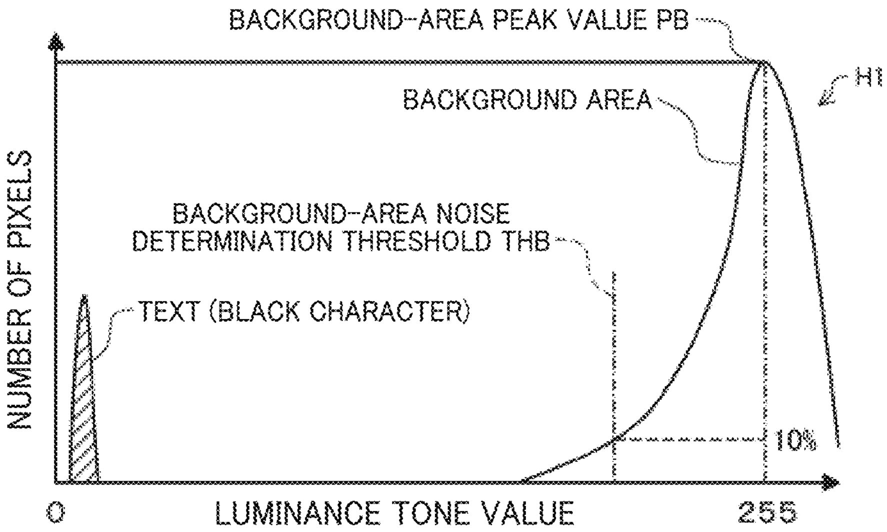
FIGS. 9A and 9B are explanatory diagrams illustrating the details of background-area noise determination threshold setting processes according to the first embodiment and a comparative example.
Figure 9B:
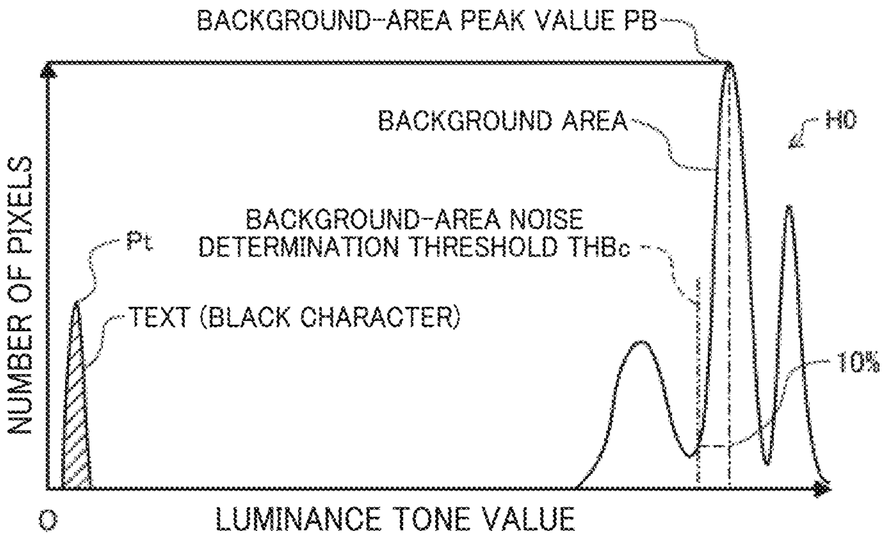
Figure 10A:
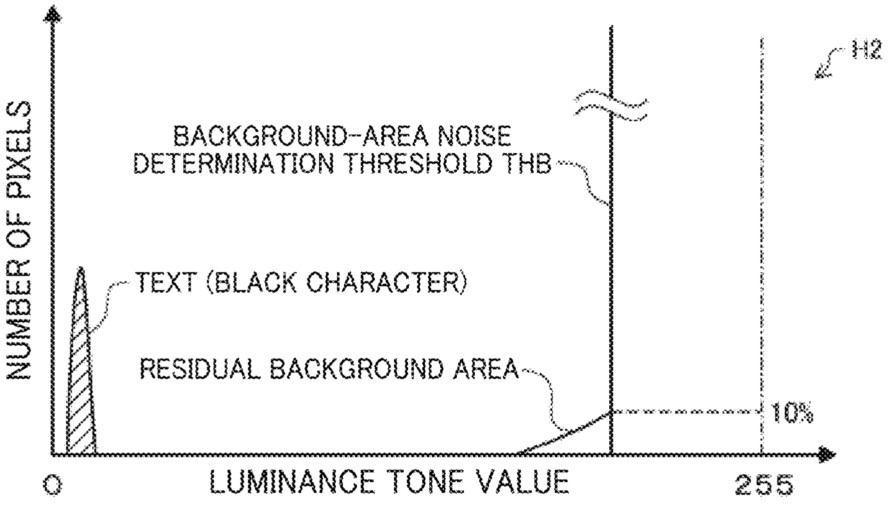
FIGS. 10A and 10B are explanatory diagrams illustrating the details of background-area noise removal processes according to the first embodiment and the comparative example.
Figure 10B:
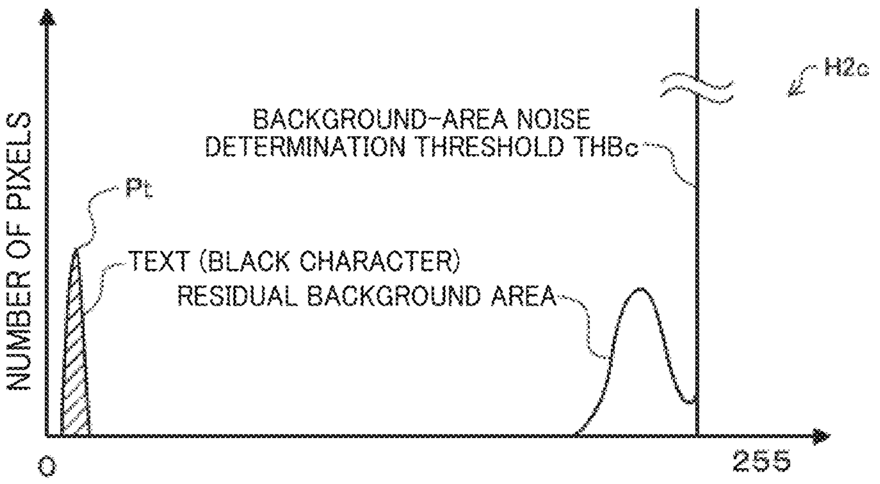

FIGS. 9A and 9B are explanatory diagrams illustrating the details of background-area noise determination threshold setting processes according to the first embodiment and a comparative example. FIGS. 10A and 10B are explanatory diagrams illustrating the details of background-area noise removal processes according to the first embodiment and the comparative example. FIG. 9A illustrates a method for setting the background-area noise determination threshold THB according to the first embodiment. FIG. 9B is an explanatory diagram illustrating the details of the background-area noise determination threshold setting process according to the comparative example. FIG. 10A is an explanatory diagram illustrating the details of the background-area noise removal process according to the first embodiment. FIG. 10B is an explanatory diagram illustrating the details of the background-area noise removal process according to the comparative example.

In this example, the binarization processing unit 140 searches for the luminance tone value having the number of pixels (frequency) within a specific range of percentages (e.g., at 10%) of the number of pixels at peak, which is the number of pixels of a peak value PB in the distribution of the background-area image, from the side of a background peak tone value, which is the luminance tone value of the peak value PB, to the side with a lower luminance tone value (the side with a higher density).

It is understood that, with the background-area noise determination threshold THB (FIG. 9B) according to the comparative example, it is difficult for the binarization processing unit 140 to set the background-area noise determination threshold with which a background-area noise may be effectively removed, as the tone value distribution of the background-area pixel group is discrete (jagged) (see FIG. 10B). Conversely, with the background-area noise determination threshold THB according to the first embodiment (FIG. 9A), the binarization processing unit 140 may smoothly set the appropriate background-area noise determination threshold so as to effectively eliminate a background-area noise, as the tone value distribution of the background-area pixel group is formed to have the single peak (FIG. 10A).

Thus, the binarization processing unit 140 may set the searched threshold as the background-area noise determination threshold THB. As a high-frequency component (the tone region (noisy and jagged luminance component) of the background area where fluctuations in a pixel value are sharp) have been smoothed in the luminance histogram H1 as described above, the binarization processing unit 140 may smoothly set the background-area noise determination threshold THB so as to prevent the excessive residuals of the background area. The specific range of percentages is preferably 5% to 20%, more preferably 5% to 15%, and most preferably around 10%.

At Step S400, the binarization processing unit 140 compares the page threshold THP with the background-area noise determination threshold THB. When the page threshold THP is more than the background-area noise determination threshold THB (Yes at Step S400), the process proceeds to Step S500. When the page threshold THP is less than or equal to the background-area noise determination threshold THB (No at Step S400), the process proceeds to Step S600.

At Step S500, the binarization processing unit 140 replaces the value of the background-area noise determination threshold THB with the value of the page threshold THP for resetting. Thus, the binarization processing unit 140 may prevent the situation where, in a case where the background-area noise determination threshold THB is set to be excessively low, a background-area noise is excessively deleted during a background-area noise removal process and the text image, or the like, which is to be left, is deleted.

At Step S600, the binarization processing unit 140 functions as a background noise reduction processing unit to execute a background-area noise removal process (also referred to as "background noise reduction process"). During the background-area noise removal process, the binarization processing unit 140 sets the pixel value of a pixel having a higher luminance tone value (lower density) than the background-area noise determination threshold THB as the luminance tone value of the background-area noise determination threshold THB.

This allows the binarization processing unit 140 to generate monochrome image data MD2 having a luminance histogram H2. In the luminance histogram H2, as the luminance tone value distribution of the background-area image is smoothed with the focus on the background-area noise determination threshold THB and the contrast is lowered, it is possible to suppress improper discrimination between a noise (particularly edge) and a pattern image during the binarization process (Step S700) described below.

Figure 11A:
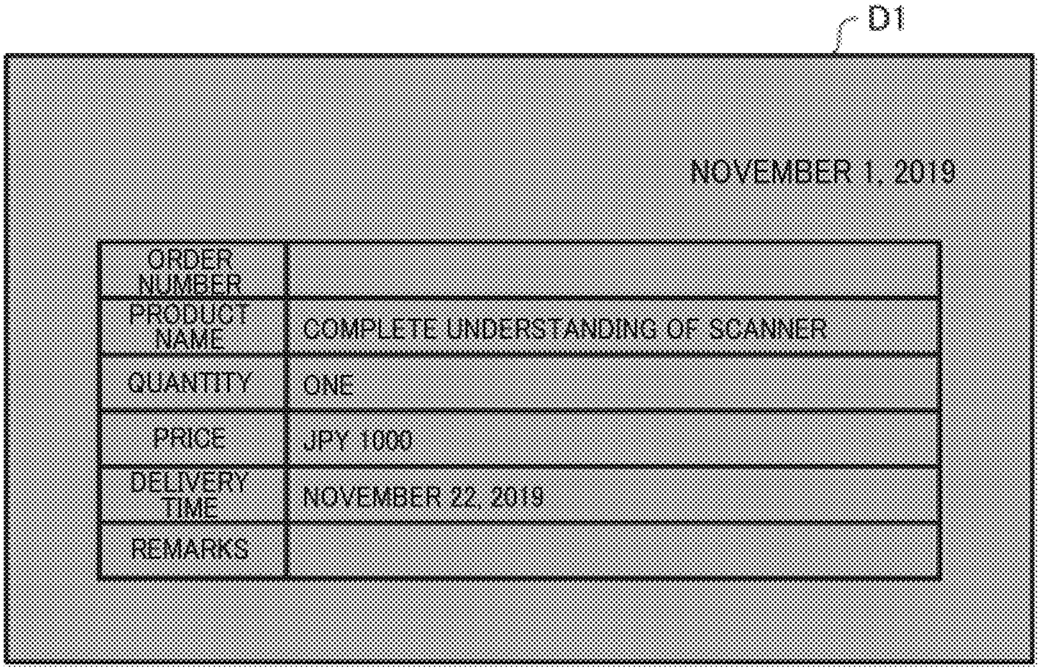
FIGS. 11A and 11B are explanatory diagrams illustrating the details of a background-area noise removal process and a binarization process according to the first embodiment.
Figure 11B:
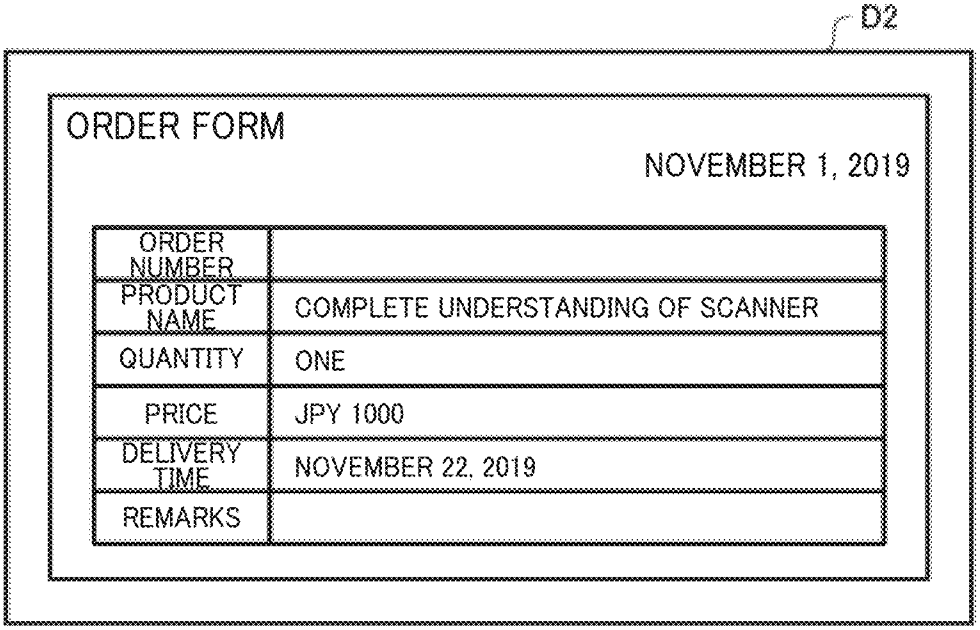

FIGS. 11A and 11B are explanatory diagrams illustrating the details of a background-area noise removal process and a binarization process according to the first embodiment. In this example, it is assumed that, contrary to the binarization process (Step S700) described below, the binarization processing unit 140 performs the process with the threshold for the binarization process fixed at the page threshold THP. FIG. 11A illustrates a monochrome image D1 after a background-area noise removal process. The monochrome image D1 includes the (fine) background image that is monotone and has an improved granularity as the monochrome image D1 is subjected to the process to increase the luminance of a pixel having a significantly low luminance and decrease the luminance of a pixel having a significantly high luminance in the background-area image.

FIG. 11B illustrates a binary image D2 after the binarization process according to the first embodiment. The binary image D2 is an appropriate image without degradation in the granularity as there is a significant reduction in the number of pixels of the background region that is improperly determined to be a pixel in the pattern region due to the setting of the page threshold THP according to the first embodiment. This reduction in improper determination is achieved due to a reduction in the granularity by the background-area noise removal process and a reduction in the local contrast.

As described above, the image forming apparatus 10 according to the first embodiment executes a low-pass filtering process as preprocessing before setting the threshold for the binarization process. Thus, the binarization processing unit 140 may reduce noises of a background-area image and reduce the variance of luminance tone values. A noise reduction in a background-area image may reduce the deterioration of granularity due to a binarization process. A reduction in the variance of luminance tone values may narrow the width of the distribution of the background-area image centered on the average value of the luminance tone values of the background-area image and may smooth changes in the tone value of the distribution so as to facilitate the setting of the background-area noise determination threshold THB.

Figure 12:
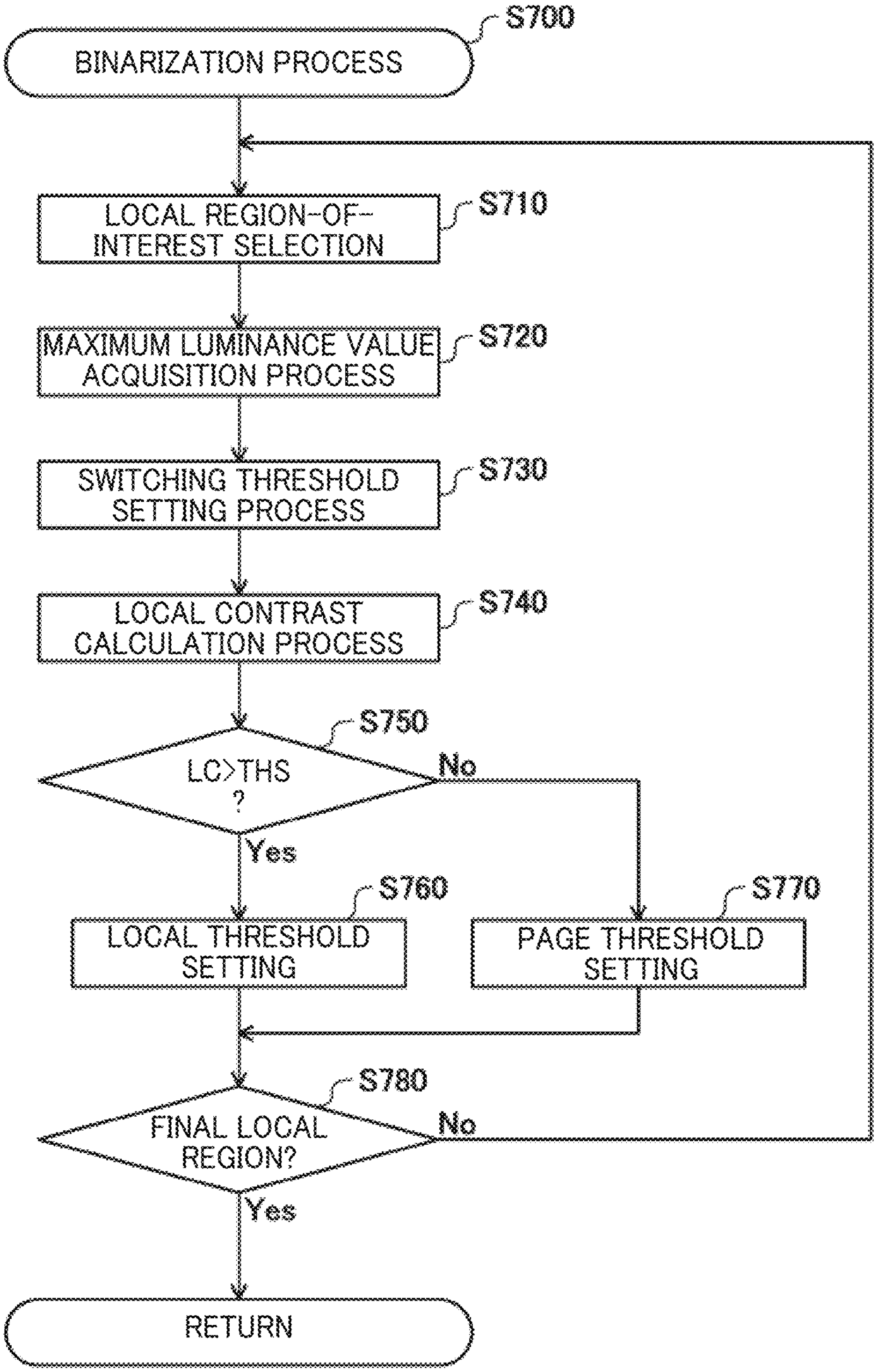
FIG. 12 is a flowchart illustrating the details of a binarization process according to the first embodiment.

FIG. 12 is a flowchart illustrating the details of the binarization process (Step S700) according to the first embodiment. At Step S710, the binarization processing unit 140 functions as a local region-of-interest selecting unit to divide the pixels forming the monochrome image data MD2 (also referred to as "input image data") into a plurality of local regions including (M×N) pixels (M and N are, for example, integers equal to or more than three) and sequentially select the divided local regions as a local region of interest. The local region of interest is, for example, the region having 5×5 pixels as a reference size. The reference size is set in accordance with, for example, the resolution of the image to be processed.

Figure 13:
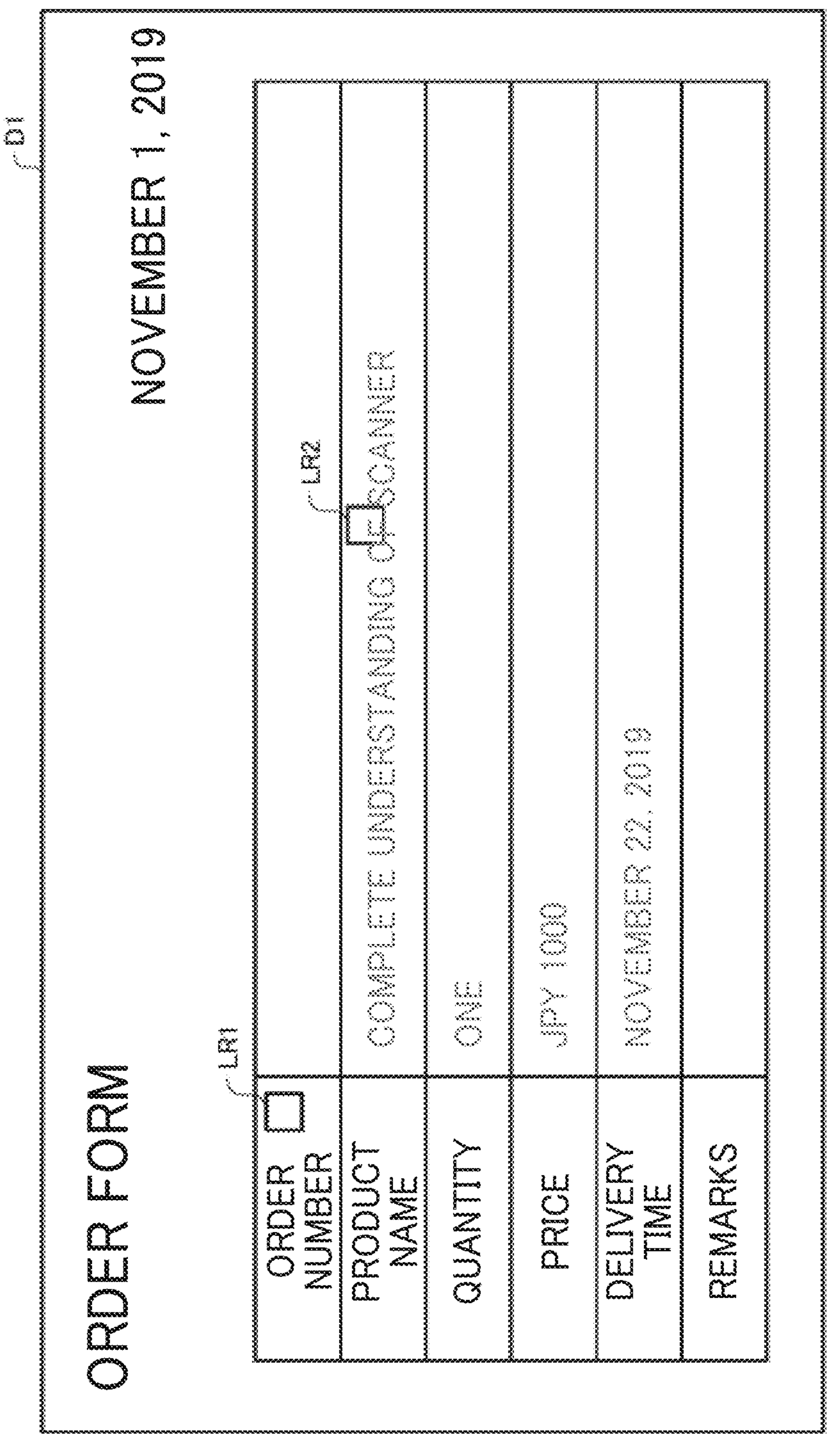
FIG. 13 is an explanatory diagram illustrating the manner of selection of a local region of interest according to the first embodiment.

FIG. 13 is an explanatory diagram illustrating the manner of selection of a local region of interest according to the first embodiment. FIG. 14A is a graph illustrating a switching threshold THS according to the first embodiment. In this example, two local regions LR1 and LR2 are illustrated. In a case where the local region LR1 is selected as a local region of interest, as the text image of a black character falls within the reference range, the minimum luminance value is close to zero, and the maximum luminance value is the luminance value of the background area, i.e., the luminance value near the background-area noise determination threshold THB. Conversely, in a case where the local region LR2 is selected, as the light text image falls within the reference range, the minimum luminance value is the luminance value of the light text image, i.e., the luminance value near the background-area noise determination threshold THB, and the maximum luminance value is the luminance value of the background area.

At Step S720, the binarization processing unit 140 executes a maximum luminance value acquisition process. During the maximum luminance value acquisition process, the binarization processing unit 140 acquires the maximum luminance value within the local region of interest. Specifically, the binarization processing unit 140 acquires the maximum luminance value of the background area within each local region regardless of whether the local region of interest is the local region LR1 or the local region LR2. In this example, it is assumed that the binarization processing unit 140 acquires a local maximum luminance value L_Max (luminance value of 170) in the local region LR2 (see FIG. 14A). The maximum luminance value is the maximum tone value of the luminance and may be the maximum tone value that is the density tone value on the side with the lowest density.

At Step S730, the binarization processing unit 140 functions as a switching threshold setting unit to execute a switching threshold setting process. During the switching threshold setting process, the binarization processing unit 140 reads a preset binarization-threshold switching threshold table (also referred to as "threshold switching table") T from the storage unit 240 so as to set the switching threshold THS. In this example, it is assumed that the binarization processing unit 140 acquires "30" as the switching threshold THS based on the local maximum luminance value L_Max (luminance value of 170).

The threshold switching table T is a table obtained by discretizing the switching threshold THS defined by Formula F4 (see FIG. 14B). The switching threshold THS is set based on the discloser's knowledge that, as the luminance of the background region (the background-area image in this example) is lower, the contrast generated in the local region is more likely to be caused not due to the pattern region but due to the noise of the image in the background region. In an experiment and a simulation, the discloser of the subject application has found that it is preferable to change the switching threshold THS in accordance with the maximum tone value. Specifically, it has been found out that it is preferable that the switching threshold THS is set to be higher as the maximum tone value is lower (the density is higher) and, particularly, is set to change linearly.

At Step S740, the binarization processing unit 140 executes a local contrast calculation process. During the local contrast calculation process, the binarization processing unit 140 calculates the difference between the maximum luminance value (170 in this example) and the minimum luminance value (120 in this example) in 25 pixels of 5×5 within a local region as local contrast LC (see Formula F5 of FIG. 14B). In this example, it is assumed that the binarization processing unit 140 acquires "50" (=170−120) as the local contrast LC. The minimum luminance value is the minimum tone value of the luminance and may be the minimum tone value that is the tone value on the side with the highest density.

At Step S750, the binarization processing unit 140 determines whether the local contrast LC is more than the switching threshold THS. When the local contrast LC is more than the switching threshold THS (Yes at Step S750), the process proceeds to Step S760. When the local contrast LC is equal to or less than the switching threshold THS (No at Step S750), the process proceeds to Step S770. Thus, the binarization processing unit 140 may be prevented from improperly determining that a noise in the background region is the contrast in the pattern region and may prevent a void of a character.

At Step S760, the binarization processing unit 140 sets a local threshold THL (see Formula F6 of FIG. 14B) as a binarization process threshold used for the binarization process on the local region LR2. In this example, in Formula F6, the coefficient $\alpha$ is, for example, a numerical value of 0.1 or more. At Step S770, the binarization processing unit 140 sets the page threshold THP as the binarization process threshold used for the binarization process on the local region LR2. The process from Step S710 to Step S770 is executed on all the local regions (Step S780). The local threshold may be any local threshold set in the range between the maximum tone value and the minimum tone value.

FIGS. 15A, 15B and 15C are explanatory diagrams illustrating the details of the binarization process according to the first embodiment. FIG. 15A illustrates a document image D0*a* representing a light text image. As the document image D0*a* has the same background image as that of the document image D0 (see FIG. 3A), the background area is removed from the illustration for the sake of easy description. FIG. 15B illustrates an image Dca after a binarization process according to a comparative example. In this example, the light text image is improperly determined as a background image and is eliminated from the image Dca in the binarization process. FIG. 15C illustrates the binary image D2 after the binarization process according to the first embodiment. In this example, the light text image is determined to be an image in the pattern region and is clearly reproduced in the binary image D2 in the binarization process.

As described above, the image forming apparatus 10 according to the first embodiment adjusts the switching threshold THS in accordance with the luminance tone value corresponding to the maximum luminance value within the local region and appropriately switches between the local threshold THL and the page threshold THP based on the switching threshold THS to execute a binarization process. This makes it easier to achieve both the determination of a low-density image (e.g., a light text) and the suppression of an image noise. As the image forming apparatus 10 reduces the contrast of a background-area noise during the background-area noise removal process, it is possible to prevent the improper determination that a noise of the background region is the contrast of a low-density image.

B. Second Embodiment

Figure 16:
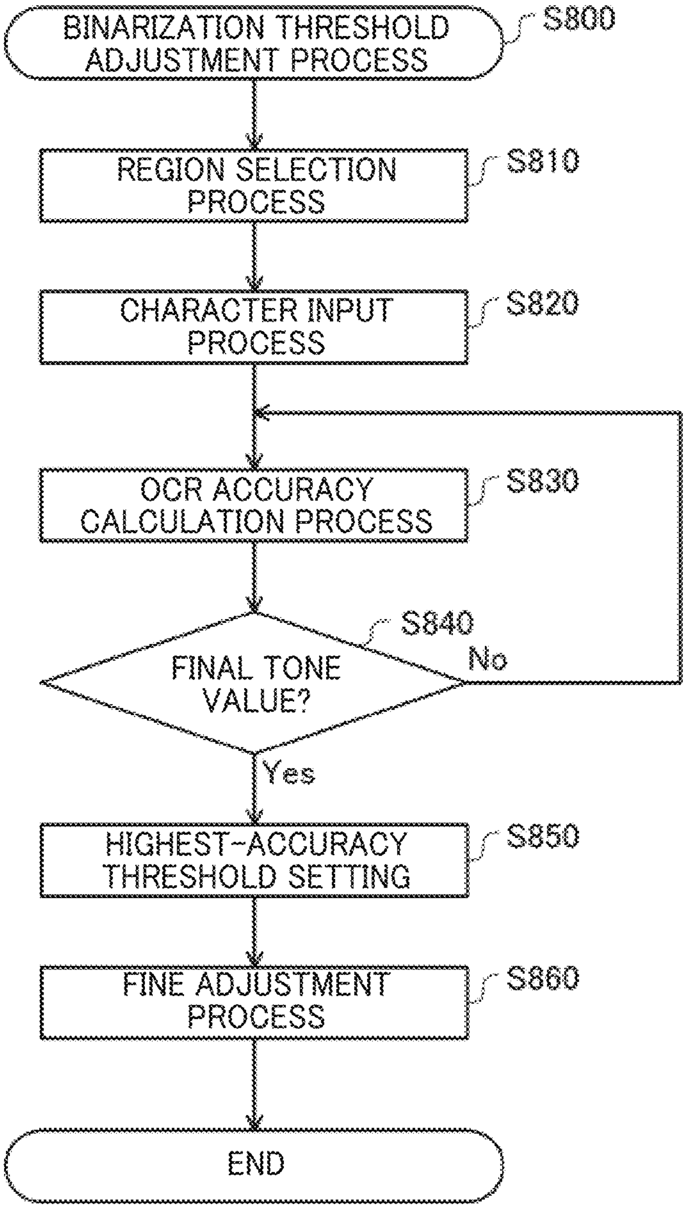
FIG. 16 is a flowchart illustrating the details of a binarization threshold adjustment process according to a second embodiment.

FIG. 16 is a flowchart illustrating the details of a binarization threshold adjustment process (Step S800) according to a second embodiment. The binarization process according to the second embodiment is configured such that, after the binarization process according to the first embodiment, the binarization threshold is adjusted in accordance with the user's request so that the binarization process may be executed again. The binarization process according to the second embodiment is different from the binarization process according to the first embodiment in that the binarization threshold adjustment process (Step S800) is additionally performed at the end of the process.

Figure 17A:
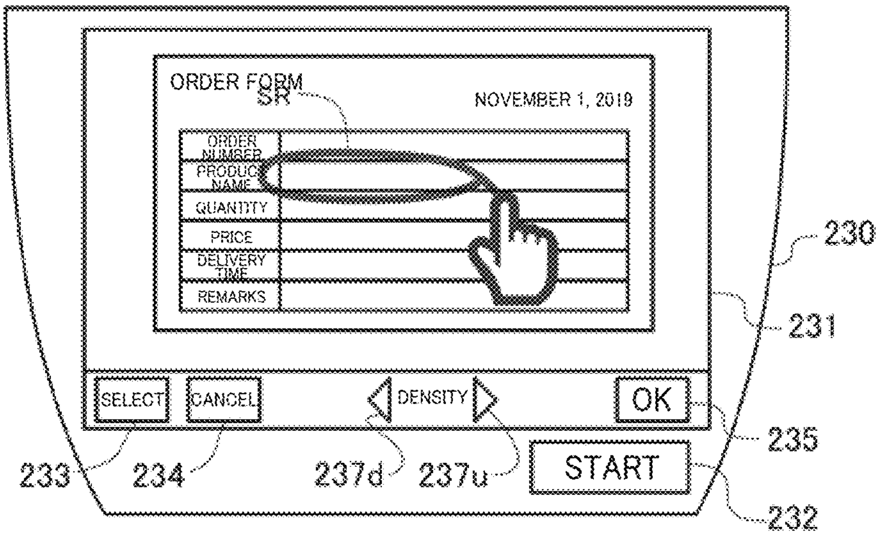
FIGS. 17A and 17B are explanatory diagram illustrating an operation display screen according to the second embodiment.
Figure 17B:
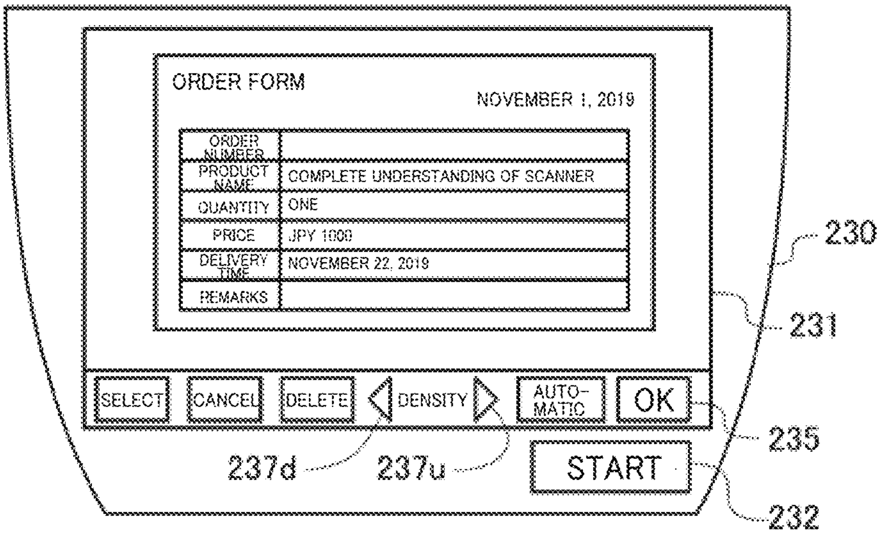

FIGS. 17A and 17B are explanatory diagram illustrating an operation display screen according to the second embodiment. After the binarization process, the binarization threshold adjustment process (Step S800) is started as an interactive fine adjustment process mode in accordance with a specific user's input to the operation display unit 230. The operation display unit 230 includes a user interface screen 231 and a start button 232. The user interface screen 231 has an interactive fine adjustment process mode and includes a selection icon 233, a cancel icon 234, an OK icon 235, a density decrease icon 237*d*, and a density increase icon 237*u*.

At Step S810, the operation display unit 230 receives the user's input for selecting a region. After the user touches and inverts the selection icon 233, the user may slide the finger on the user interface screen 231 to designate a selection region SR. When the selection region is selected again, the user may touch the cancel icon 234 to cancel the designated selection region SR. In this state, when the OK icon 235 is touched, the operation display unit 230 displays a pop-up screen (not illustrated) for inputting a character.

At Step S820, the operation display unit 230 receives the user's input through the pop-up screen (not illustrated) for inputting a character. When the OK icon (not illustrated) on the pop-up screen is touched after the user's input of a character or without any input, the process proceeds to Step S830.

At Step S830, the OCR processing unit 211 of the control unit 210 executes an OCR accuracy calculation process. During the OCR accuracy calculation process, the OCR processing unit 211 recognizes the input character, obtains the OCR accuracy (recognition accuracy) as a numerical value, and calculates the integrated value of the recognition accuracy of each character. The OCR processing unit 211 calculates the OCR accuracy for each threshold while changing the threshold between an average luminance value $m_1$ (see FIG. 8) of the class 1 and an average luminance value $m_2$ of the class 2 set for the threshold TH1 and the page threshold according to the first embodiment (Step S840). The OCR processing unit 211 is also referred to as a character recognition processing unit. The average luminance value $m_1$ is also referred to as a first average tone value. The average luminance value $m_2$ is also referred to as a second average tone value.

At Step S850, the OCR processing unit 211 of the control unit 210 sets the highest-accuracy threshold. The highest-accuracy threshold is the threshold with the highest integrated value of the recognition accuracy of each input character. The binarization processing unit 140 executes a binarization process on the selection region SR by using the highest-accuracy threshold and displays the binary image, which has undergone the binarization process, on the user interface screen 231 in real time. For example, the user may make a selection so as to set the entire page as the target on which the binarization process is executed using the highest-accuracy threshold.

At Step S860, the operation display unit 230 receives the user's input for a fine adjustment process. During the fine adjustment process, it is possible to make fine adjustment with the threshold that is increased by touching the density decrease icon 237*d* and to make fine adjustment with the threshold that is decreased by touching the density increase icon 237*u*.

As described above, in a case where the user is not satisfied with the result of automatic processing according to the first embodiment, the image forming apparatus 10 according to the second embodiment makes it possible to automatically change the threshold with the highest ORC accuracy between the average luminance value $M_1$ of the class 1 and the average luminance value $M_2$ of the class 2 in a specific region or the entire page and reproduce, in an interactive fine adjustment process mode, the character that has been deleted during the binarization process in the automatic processing.

Thus, the image forming apparatus 10 may easily deal with, for example, faulty images (all white or all black) and may perform the binarization process desired by the user. It is preferable that the density decrease icon 237*d* and the density increase icon 237*u* may be used in the range of all the tone values or in the range between the average luminance value $M_1$ and the average luminance value $M_2$ even when the process from Step S810 to Step S850 is not executed.

C. Modification

The present disclosure may be implemented not only in the above-described embodiment but also in the modifications below.

Modification 1: although the filter used during the low-pass filtering process according to the above embodiment is a Gaussian filter, the filter is not limited to the Gaussian filter and, for example, a moving-average filter may be used. Further, a bandpass filter, such as a Difference of Gaussian (DOG) filter, which enables the enhancement of a line drawing as well as the removal of a noise, may be used as long as the filter has the characteristics so as to remove noises of a background image (e.g., a background-area image).

Figure 18A:
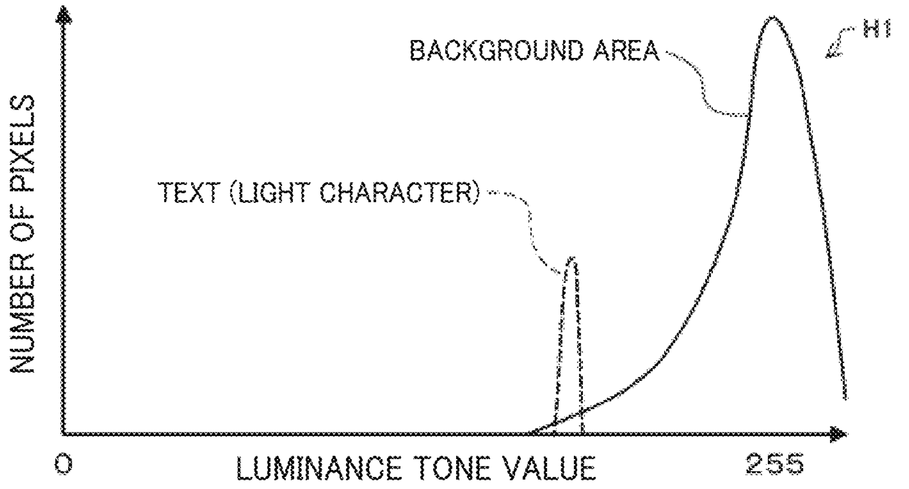
FIGS. 18A and 18B are explanatory diagrams illustrating the details of a filtering process according to a modification.
Figure 18B:
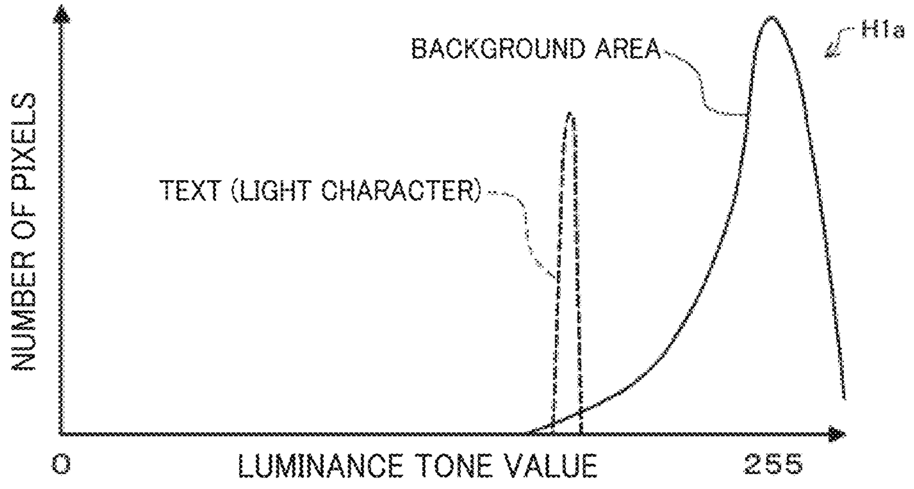

FIGS. 18A and 18B are explanatory diagrams illustrating the details of a filtering process according to a modification. FIG. 18A is identical to FIG. 9A and illustrates the luminance histogram H1 of the monochrome image data MD1 after a Gaussian filtering process. FIG. 18B illustrates a histogram H1*a* of the monochrome image data MD1*a* after a DOG filtering process. In the histogram H1*a*, the text that is a light character is enhanced. Thus, with regard to the setting of the threshold for a binarization process, it is possible to set the appropriate threshold so as to increase the possibility that the text that is a light character remains.

Modification 2: Although the luminance tone value and the luminance histogram are used according to the above embodiment, for example, a density tone value and a density histogram may be used. The density is, for example, the density tone value of the K color material when it is assumed that the K color material is used for printing.

Modification 3: although the present disclosure is applied to an image forming apparatus according to the above embodiment, the present disclosure is not necessarily limited to an image forming apparatus, and the present disclosure is applicable to an electronic device functioning as an image processing apparatus such as an image reading apparatus or a mobile terminal.

The embodiment of the present disclosure is explained above with reference to the drawings (FIGS. 1-18). However, the present disclosure is not limited to the above-described embodiment and may be implemented in various forms without departing from the scope of the present disclosure. Furthermore, the configuration described in the above embodiment is an example and is not particularly a limitation, and various changes may be made without substantially departing from the advantage of the present disclosure.

What is claimed is:

1. An image processing apparatus comprising:

a filtering processing unit that executes a filtering process to suppress a background noise of input image data;

a threshold setting unit that sets a binarization threshold for the input image data having undergone the filtering process;

a background noise determination threshold setting unit that determines that a tone value at which a number of pixels of a background noise of the input image data having undergone the filtering process reaches a peak is a background peak tone value and that sets, as a background noise determination threshold, a tone value having a density higher than a density of the background peak tone value and having a number of pixels within a specific range of percentages of the number of pixels at the peak;

a background noise reduction processing unit that executes a background noise reduction process on the input image data having undergone the filtering process in accordance with the binarization threshold and the background noise determination threshold; and a binarization processing unit that executes a binarization process on the input image data having undergone the background noise reduction process in accordance with the binarization threshold.

2. The image processing apparatus according to claim 1, wherein the background noise reduction process is a process to set all tone values of pixels having a tone value at a lower density than the background noise determination threshold to the background noise determination threshold, and the background noise reduction processing unit uses the binarization threshold as the background noise determination threshold when the background noise determination threshold is lower than the binarization threshold.

3. The image processing apparatus according to claim 1, wherein the filtering processing unit executes a low-pass filtering process using a Gaussian filter.

4. The image processing apparatus according to claim 1, wherein the filtering processing unit executes a low-pass filtering process using a difference of Gaussian filter.

5. The image processing apparatus according to claim 1, wherein the threshold setting unit sets a tone value determined according to a discriminant analysis method as the binarization threshold for the input image data having undergone the filtering process.

6. The image processing apparatus according to claim 1, wherein the binarization processing unit includes a local region-of-interest selecting unit that divides a plurality of pixels included in the input image data into a plurality of local regions including (M×N) pixels (M and N are integers equal to or more than three) and sequentially selects the divided local regions as a local region of interest; and a switching threshold setting unit that acquires a maximum tone value at a lowest density among tone values of a plurality of pixels included in the local region of interest and sets a higher switching threshold as the maximum tone value is lower, and based on the switching threshold, switches a threshold for the binarization process between the binarization threshold and a local threshold set in a range between the maximum tone value and a minimum tone value of the local region of interest to execute the binarization process on the local region of interest.

7. The image processing apparatus according to claim 6, wherein the switching threshold setting unit linearly changes the switching threshold in accordance with a change in the maximum tone value.

8. The image processing apparatus according to claim 6, wherein the binarization processing unit compares a local contrast, which is a difference between the maximum tone value and the minimum tone value of the local region of interest, with the switching threshold corresponding to the maximum tone value, executes the binarization process on the local region of interest by using the local threshold when the local contrast is more than the switching threshold, and executes the binarization process on the local region of interest by using the binarization threshold when the local contrast is equal to or less than the switching threshold.

9. The image processing apparatus according to claim 1, further comprising:

a histogram analyzing unit that calculates a first average tone value that is an average tone value of a first class and a second average tone value that is an average tone value of a second class including a relatively high proportion of a background image according to a discriminant analysis method for the input image data; and an operation display unit that receives a user's input for adjusting a threshold for the binarization process in a range between the first average tone value and the second average tone value, wherein the binarization processing unit adjusts the threshold in accordance with a user's input, which is input to the operation display unit, and executes the binarization process by using the adjusted threshold, and the operation display unit displays an image having undergone the binarization process in real time in response to the user's input.

10. The image processing apparatus according to claim 9, further comprising a character recognition processing unit that executes recognition of a character included in the input image data, calculates recognition accuracy that is accuracy of the recognition, and calculates an integrated value of the recognition accuracy of each character, wherein the binarization processing unit sequentially selects the threshold in a range between the first average tone value and the second average tone value, the character recognition processing unit calculates the integrated value for each of the selected thresholds, and the binarization processing unit executes the binarization process using a threshold having the highest integrated value.

* * * * *